US012058956B2

(12) United States Patent
Huss et al.

(10) Patent No.: US 12,058,956 B2
(45) Date of Patent: Aug. 13, 2024

(54) MULCH KIT CONTROL LEVER

(71) Applicant: DEERE & COMPANY, Moline, IL (US)

(72) Inventors: Trevor Huss, Brownsville, WI (US); Kyle T. Ressler, West Bend, WI (US); Ryan S. Strasser, Juneau, WI (US)

(73) Assignee: DEERE & COMPANY, Moline, IL (US)

( * ) Notice: Subject to any disclaimer, the term of this patent is extended or adjusted under 35 U.S.C. 154(b) by 768 days.

(21) Appl. No.: 17/009,050

(22) Filed: Sep. 1, 2020

(65) Prior Publication Data
US 2022/0061210 A1    Mar. 3, 2022

(51) Int. Cl.
*A01D 34/00* (2006.01)
*A01D 42/00* (2006.01)
A01D 101/00 (2006.01)

(52) U.S. Cl.
CPC ......... *A01D 34/005* (2013.01); *A01D 34/006* (2013.01); *A01D 42/005* (2013.01); *A01D 2101/00* (2013.01)

(58) Field of Classification Search
CPC .... A01D 34/00; A01D 34/001; A01D 34/006; A01D 34/71; A01D 34/82; A01D 34/81; A01D 34/005; A01D 2101/00; A01D 42/005; A01D 43/06; A01D 43/063; A01D 43/0631
See application file for complete search history.

(56) References Cited

U.S. PATENT DOCUMENTS

| 4,072,332 A  * | 2/1978  | Isaia ..................... E05C 3/122 292/228 |
| 5,205,112 A    | 4/1993  | Tillotson et al. |
| 5,826,417 A  * | 10/1998 | Evans ................. A01D 34/828 56/320.2 |
| 5,845,475 A    | 12/1998 | Busboom et al. |
| 6,609,358 B1 * | 8/2003  | Schmidt .............. A01D 42/005 56/320.2 |
| 7,055,301 B2   | 6/2006  | Osborne et al. |
| 7,174,700 B2 * | 2/2007  | Chenevert ........... A01D 42/005 56/2 |

(Continued)

FOREIGN PATENT DOCUMENTS

| EP | 1752035 B1 * | 3/2009 | ........... A01D 34/005 |
| EP | 3329759 A2 * | 6/2018 | ........... A01D 34/005 |

OTHER PUBLICATIONS

John Deere, Lever-action or electric one-touch MulchControl options are available for extra mowing convenience, John Deere Sales Manual, pp. 1-2 [online], [retrieved on Aug. 26, 2019]. Retrieved from the Internet <URL:http://salesmanual.deere.com/sales/salesmanual/enNA/lawnequipment/2018/feature/mower_decks_m.>.

*Primary Examiner* — Adam J Behrens

(57) ABSTRACT

A mulch kit control lever includes a handle pivotably mounted to a support plate with a tension spring connecting the handle to the support plate and urging the handle to pivot to either a mulching position or a side discharge position relative to the support plate. The tension spring is connected before the mulch kit control lever is installed on the mower deck. A retainer slides in a slot in one of the support plate and the handle preventing over-travel of the handle past the mulching position and the side discharge position.

4 Claims, 3 Drawing Sheets

(56) References Cited

U.S. PATENT DOCUMENTS

| | | | |
|---|---|---|---|
| 7,448,195 B2 * | 11/2008 | Kohler | A01D 34/82 56/320.2 |
| 7,650,739 B2 * | 1/2010 | Butler | A01D 34/005 56/320.2 |
| 8,104,255 B1 | 1/2012 | Hurst et al. | |
| 8,171,709 B1 | 5/2012 | Bedford et al. | |
| 9,485,911 B2 * | 11/2016 | Thorman | A01D 42/005 |
| 9,699,963 B2 * | 7/2017 | Ressler | A01D 75/006 |
| 9,750,179 B2 | 9/2017 | Korthals et al. | |
| 2003/0154705 A1 | 8/2003 | Sugden et al. | |
| 2014/0075901 A1 * | 3/2014 | Kimura | A01D 34/005 56/2 |
| 2020/0214201 A1 * | 7/2020 | Bejcek | A01D 43/08 |
| 2020/0323130 A1 * | 10/2020 | Shaffer | E05F 15/70 |

\* cited by examiner

MULCH KIT CONTROL LEVER

FIELD OF THE INVENTION

This invention relates to mower decks and, more specifically, multi-blade mower decks that may be converted between side discharge and mulching positions.

BACKGROUND OF THE INVENTION

Multi-blade mower decks have been offered with hinged baffles or gates that may be pivoted between side discharge and mulching positions. For example, U.S. Pat. No. 6,609,358 for "Mower Having a Mower Deck Adapted for Selective Mulching or Non-Mulching Modes" assigned to Deere & Company relates to a multi-blade mower deck with hinged baffles or gates that may pivot from side discharge to mulching positions. The hinged baffles or gates may be connected to a mulch control lever above the deck. A mulch control lever includes an upright handle an operator may use for shifting the hinged baffles or gates between side discharge and mulching positions.

U.S. Pat. No. 9,485,911, also assigned to Deere & Company, shows a mulch control lever on a mower deck with an over center tension spring that biases the lever to the side discharge or mulching positions. U.S. Pat. No. 9,699,963 assigned to Deere & Company for a mulch kit control lever relates to a pivoting handle mounted on a detent plate, with a spring around a pivot pin extending through the detent plate to help securely hold the mulch gate in the mulching or side discharge position. These mulch kit control levers can be difficult to install and prevent unintended mulch gate openings or closings during operation.

U.S. Pat. No. 9,750,179 assigned to Deere & Company relates to an electric linear actuator with a plunger or ram that actuates a mulch control lever to move one or more hinged baffles or gates between side discharge and mulching positions. The electric linear actuator is connected to a switch that may be activated from the mower operator station. A spring or limiting switch may compensate for over or under travel of the plunger or ram of the electric linear actuator. The electric components may increase the cost and complexity of this mulch control lever.

There is a need for a low cost mulch kit control lever that is easy and quick to install, and that reduces or minimizes unintended mulch gate openings or closings during operation.

SUMMARY OF THE INVENTION

A mulch kit control lever includes a handle pivotably mounted to a support plate and then attached to a mower deck at a position spaced above a top surface of the mower deck. A mulch plate is attached to a vertical rod extending through the mower deck, support plate and handle. The handle engages the vertical rod for pivoting the mulch plate between a mulching position and a side discharge position. The mulch kit control lever includes an over-center spring connected between the handle and the support plate before being attached to the mower deck. The spring urges the handle toward the mulching position and the side discharge position on each side of an over-center position. A curved slot in each of the handle and the support plate prevents over travel of the handle past the mulching position and the side discharge position.

DESCRIPTION OF THE PREFERRED EMBODIMENT

Figure 1:
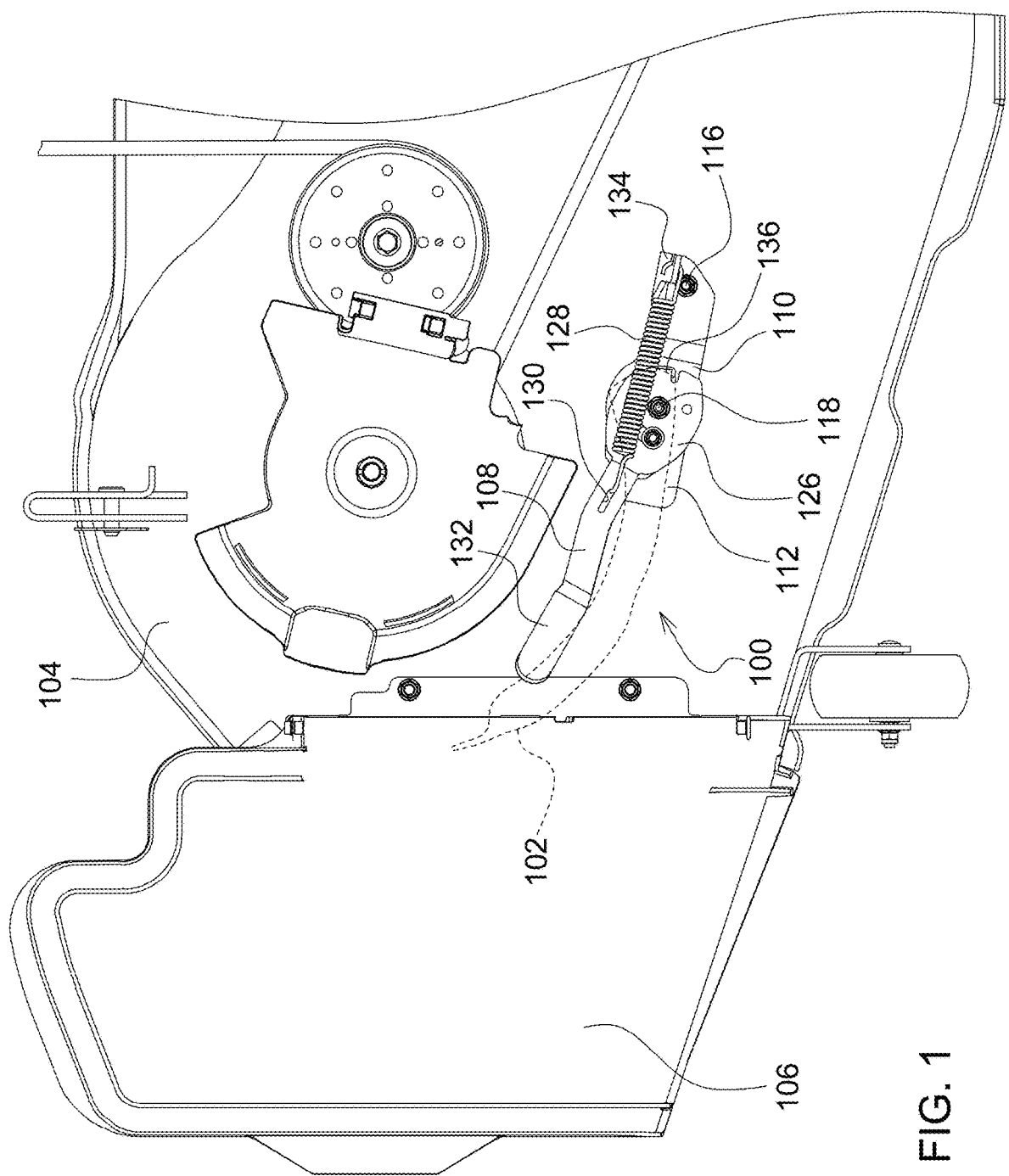
FIG. 1 is a top view of a mulch kit control lever in a mulching position, according to a first embodiment of the invention.

In one embodiment, mulch kit control lever 100 may include handle 108 pivotably mounted to support plate 110 and then attached to the top surface of mower deck 104. The handle and support plate may be sheet metal. The handle may be pivotably mounted to the support plate's generally flat horizontal surface 112 which may be spaced at least about ½ inch above the top surface of the mower deck. One or more friction reducing caps 114 may be attached or affixed to the horizontal surface of the support plate. After the over-center spring 128 is connected between the handle and support plate, the support plate may be attached at a fixed position on the top surface of the mower deck using one or more threaded fasteners 116.

Figure 2:
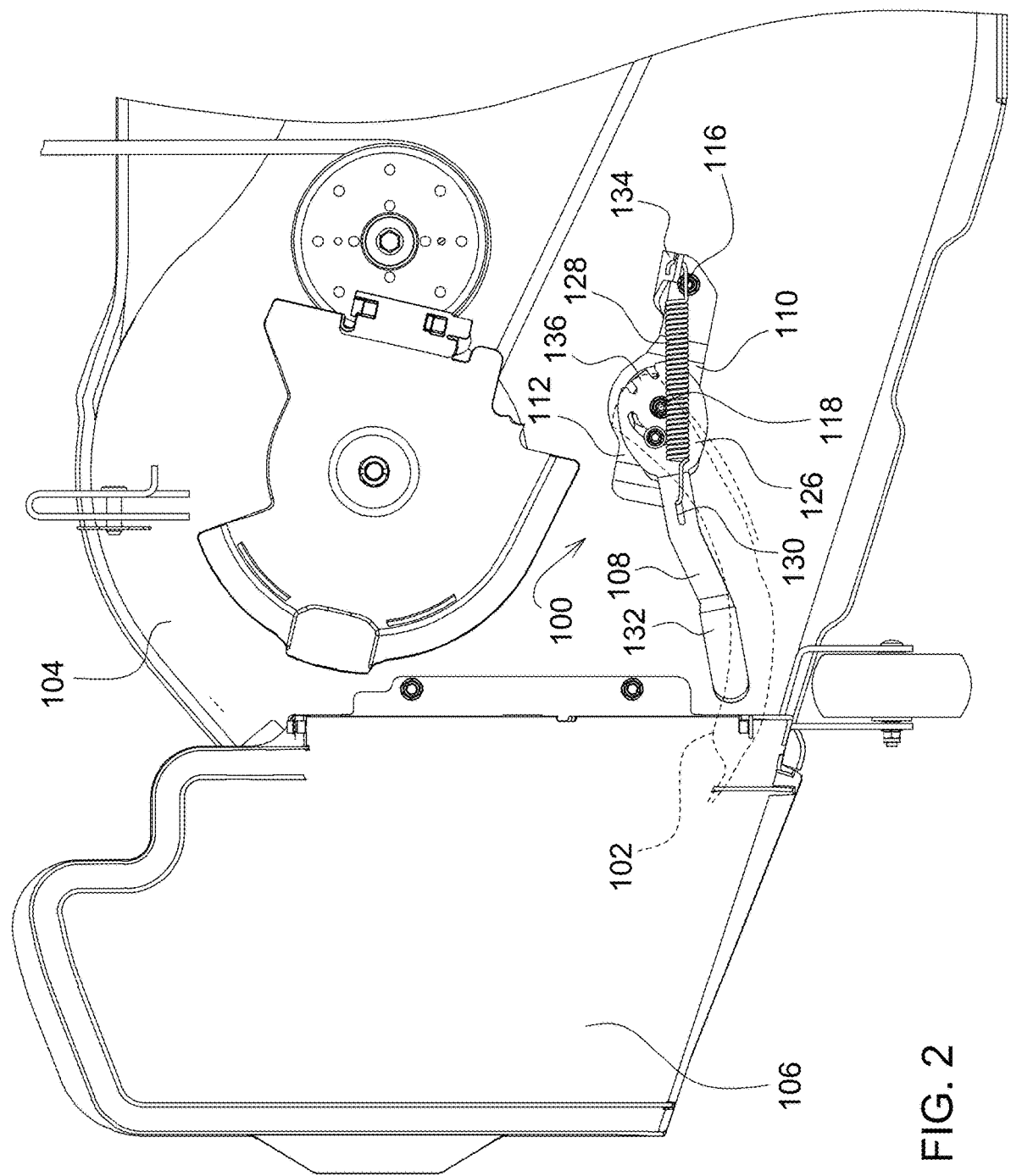
FIG. 2 is a top view of a mulch kit control lever in a side discharge position, according to a first embodiment of the invention.
Figure 3:
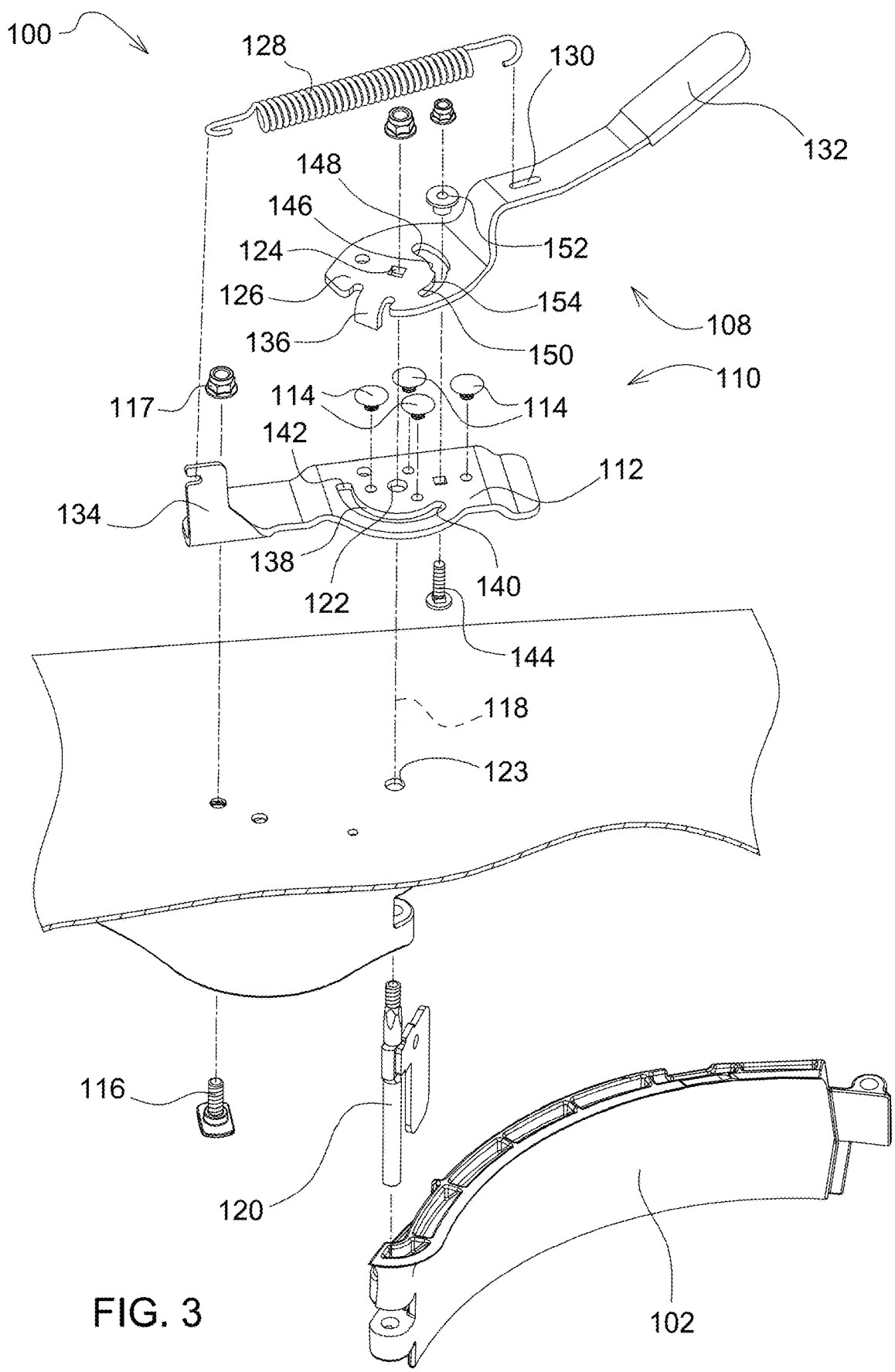
FIG. 3 is an exploded perspective view of a mulch kit control lever according to a first embodiment of the invention.

In one embodiment, mulch kit control lever 100 may be assembled at the factory and then installed by end users as part of a mulch kit on a mower deck having a plurality of rotary mower blades. The blades may be rotated by an endless belt powered by an internal combustion engine or other power source. The mulch kit control lever may pivot one or more mulch gates or baffles 102 that are pivotably mounted under the mower deck, between a mulching position shown in FIG. 1, and a side discharge position shown in FIG. 2.

In one embodiment, mulch kit control lever 100 may open and close mulch gate 102 that pivots on a generally vertically aligned pivot axis 118. The pivot axis may include a rod or hinge member 120 extending through hole 123 in the mower deck, hole 122 in support plate 110, and hole 124 adjacent a first or lower end 126 of handle 108. The hole 124 in handle 108 may be square for engaging and turning the rod or hinge member which also has a square cross section. Alternatively, the hole may have another geometric shape for engaging and turning the rod or hinge member.

In one embodiment, mulch kit control lever 100 may include over-center spring 128 connected between handle 108 and support plate 110 before they are installed on the mower deck. The over-center spring may be a coil spring providing tensioning force to urge and hold the handle at the side discharge position or mulching position. The over-center position is between the side discharge and mulching positions. The over-center spring preferably may be connected between the handle and support plate during factory assembly so that tensioning the spring is not required when the mulch kit control lever is installed by the end user on mower deck 104. A first end of the over-center spring may be connected to slot 130 on handle 132, and a second end of the over-center spring may be connected to arm 134 extending upwardly from support plate 110. Connecting the over-center spring between the handle and support plate at the factory, before the end user installs them on the mower deck, allows pre-tensioning the spring to a higher gate holding torque, and thereby reduces unintended gate openings or closings during operation of the mower deck.

In one embodiment, mulch kit control lever 100 may include tab 136 which may extend downwardly from the first or lower end of handle 108 into curved slot 138 in support plate 110. The first end 140 of curved slot 138 may allow over-travel of handle 132 for pre-tensioning over-center spring 128 during factory assembly, and the second end 142 may help align tab 136 for installation onto rod or hinge member 120. Additionally, pin 144 may extend through the support plate and upwardly through curved slot 146 in handle 108. The slot 146 may have a wider portion adjacent first end 148 and a narrowed portion 154 adjacent second end 150. A cylindrically shaped retainer 152 may be threaded or otherwise affixed to the pin 144. Pin 144 may be inserted through the narrowed portion 154 of curved slot 146 during factory assembly so that handle 132 may over-travel to the spring's un-tensioned length. However, retainer 152 then may be mounted on pin 144, and may only slide in the wider portion of slot 146 to prevent over-travel past the side discharge and mulching positions.

Having described the preferred embodiment, it will become apparent that various modifications can be made without departing from the scope of the invention as defined in the accompanying claims.

The invention claimed is:

1. A mulch kit control lever, comprising:
a handle pivotably mounted to a support plate attached to a mower deck at a position spaced above a top surface of the mower deck;
a mulch plate attached to a vertical rod extending through the mower deck, the support plate, and the handle, the handle engaging the vertical rod for pivoting the mulch plate between a mulching position and a side discharge position;
an over-center spring connecting between the handle and the support plate urging the handle toward the mulching position and the side discharge position on each side of an over-center position;
a curved slot in at least one of the handle and the support plate preventing travel of the handle past the mulching position and the side discharge position; and
a pin extending from the support plate through the curved slot.

2. The mulch kit control lever of claim 1 further comprising a tab extending from the handle through the curved slot.

3. The mulch kit control lever of claim 1 further comprising a retainer on the pin for sliding in the curved slot between the mulching position and the side discharge position.

4. A mulch kit control lever, comprising:
a handle pivotably mounted to a support plate attached to a mower deck at a position spaced above a top surface of the mower deck;
a mulch plate attached to a vertical rod extending through the mower deck, the support plate, and the handle, the handle engaging the vertical rod for pivoting the mulch plate between a mulching position and a side discharge position;
an over-center spring connecting between the handle and the support plate urging the handle toward the mulching position and the side discharge position on each side of an over-center position;
a curved slot in at least one of the handle and the support plate preventing travel of the handle past the mulching position and the side discharge position; and
a curved slot in each of the handle and the support plate.

* * * * *